United States Patent [19]
Carpenter

[11] 4,291,846
[45] Sep. 29, 1981

[54] ROTOR BRAKE FOR FISHING REEL
[75] Inventor: Robert L. Carpenter, Tulsa, Okla.
[73] Assignee: Brunswick Corporation, Skokie, Ill.
[21] Appl. No.: 76,348
[22] Filed: Sep. 17, 1979
[51] Int. Cl.[3] .................... A01K 89/02; A01K 89/00
[52] U.S. Cl. .................... 242/84.2 G; 242/84.21 R
[58] Field of Search .................... 242/84.2 A, 84.2 G, 242/84.21 R

[56] References Cited
U.S. PATENT DOCUMENTS 3,045,942  7/1962  Henze ........................... 242/84.21 R
3,586,255  6/1971  Monthal et al. ............. 242/84.21 R
3,627,223  12/1971 Monthal et al. ............. 242/84.2 G
4,109,880  8/1978  Yamasaki ..................... 242/84.21 R Primary Examiner—Edward J. McCarthy
Attorney, Agent, or Firm—John G. Heimovics

[57] ABSTRACT

This invention comprehends a unique braking mechanism for a spinning style fishing reel rotor. This brake mechanism prevents the fishing reel rotor from inadvertently or accidentally revolving when the bail is in the casting position. The braking means is provided by a removable brake shoe and a stationary brake drum.

21 Claims, 10 Drawing Figures

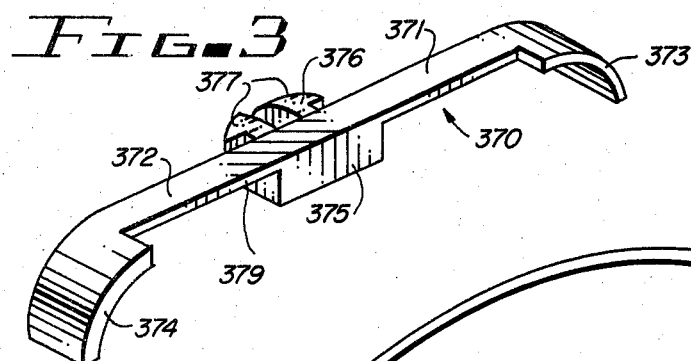
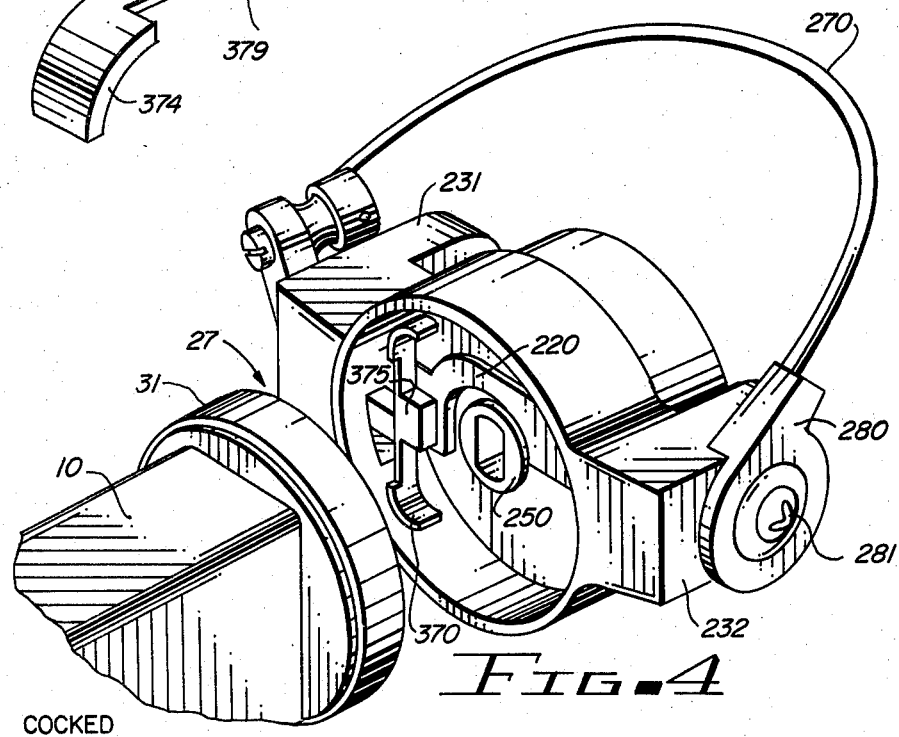
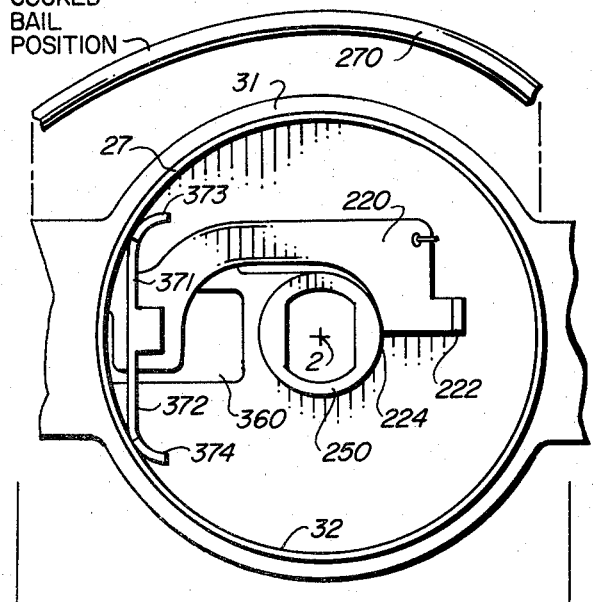
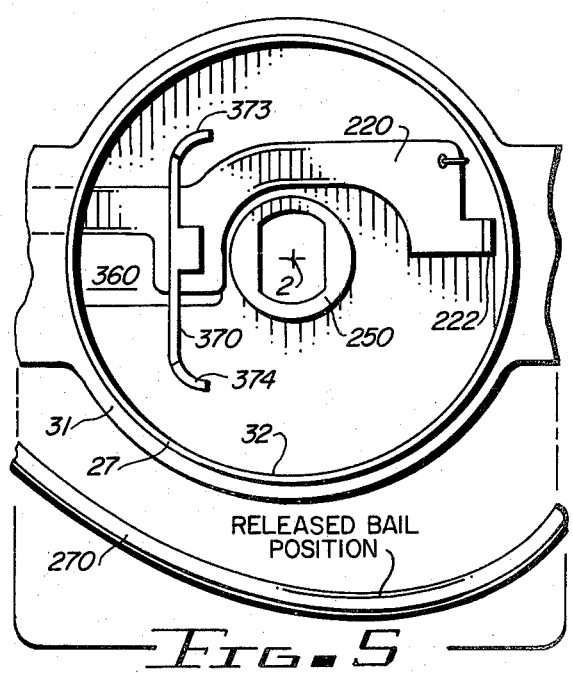

ROTOR BRAKE FOR FISHING REEL

BACKGROUND OF THE INVENTION

1. Field of the Invention

This invention relates to spinning style fishing reels, and more particularly, relates to a brake mechanism incorporated in the rotor of a fishing reel which substantially prevents the rotor from rotating when the bail is in the casting position.

2. Background of the Prior Art

It is well known in the prior art that the most sought after spinning style fishing reels were the ones that wound fishing line on the spool by almost effortless cranking of the handle. In buying fishing reels, many fishermen have been observed testing the free wheeling aspects of the rotor by revolving it around the spool, by turning the crank handle and also by simply pushing on the spool. However, the same free wheeling ability of the rotor to revolve freely about the spool is directly related to the annoying problem of the rotor inadvertently rotating when the bail is in a casting position thus causing the bail to snap to the close position at the wrong time, ie., before or during casting. Few attempts have been made to solve this problem; however, the U.S. patent application Ser. No. 932,846, filed Aug. 11, 1978, now Pat. No. 4,189,108, a mechanism is described wherein the trip lever arm is in contact with an arcuate segment mounted on the face of the reel that prevents the inadvertent movement of the trip lever thereby preventing the bail from accidentally snapping closed. This bail tripping prevention device is limited to the particular type of pivoting trip lever incorporated in that spinning reel.

As any good fisherman is aware, a simple, effective and inexpensive brake for a spinning type fishing reel that is only operational when the bail is in the casting position is quite desirable.

SUMMARY OF THE INVENTION

This invention relates to a spinning style fishing reel and comprehends a mechanism that prevents the inadvertent rotation of the fishing reel rotor when the bail is in the casting position. By eliminating this problem causing of the bail mechanism to move from the casting position to the retrieving position a significant improvement in spinning style fishing reels is made.

It is therefore an object of this invention to provide a simple, effective and inexpensive rotor braking mechanism for a spinning style fishing reel so that it operates only when the bail is in the casting position.

It is another object of this invention to provide such a brake mechanism wherein a rotary brake is attached to a trip lever that is mounted within the rotor.

Yet another object of this invention is the provision for a stationary brake drum that is mounted on the housing.

Still another object of this invention is the cooperative association of the rotary brake and the stationary brake drum.

A feature of this invention is the provision for brake shoes being flexibly attached to the brake mechanism.

Another feature of this invention is the provision whereby the brake shoes are coated with a material providing a high degree of friction between the shoes and the brake drum.

The above and other and further objects and features will be more readily understood by reference to the following detailed description and accompanying drawings.

DESCRIPTION OF THE DRAWINGS

FIG. 3 is a perspective view of one embodiment of the invention herein;

FIG. 4 is a partial exploded perspective view of a portion of a spinning reel containing the invention hereof;

FIG. 5 is a partial cutaway view of the rotor and housing of the fishing reel containing the invention hereof;

FIG. 6 is a partial cutaway view of the rotor and housing of the fishing reel containing the invention hereof;

DESCRIPTION OF BASIC STRUCTURE AND OPERATION OF FISHING REEL

Figure 1:
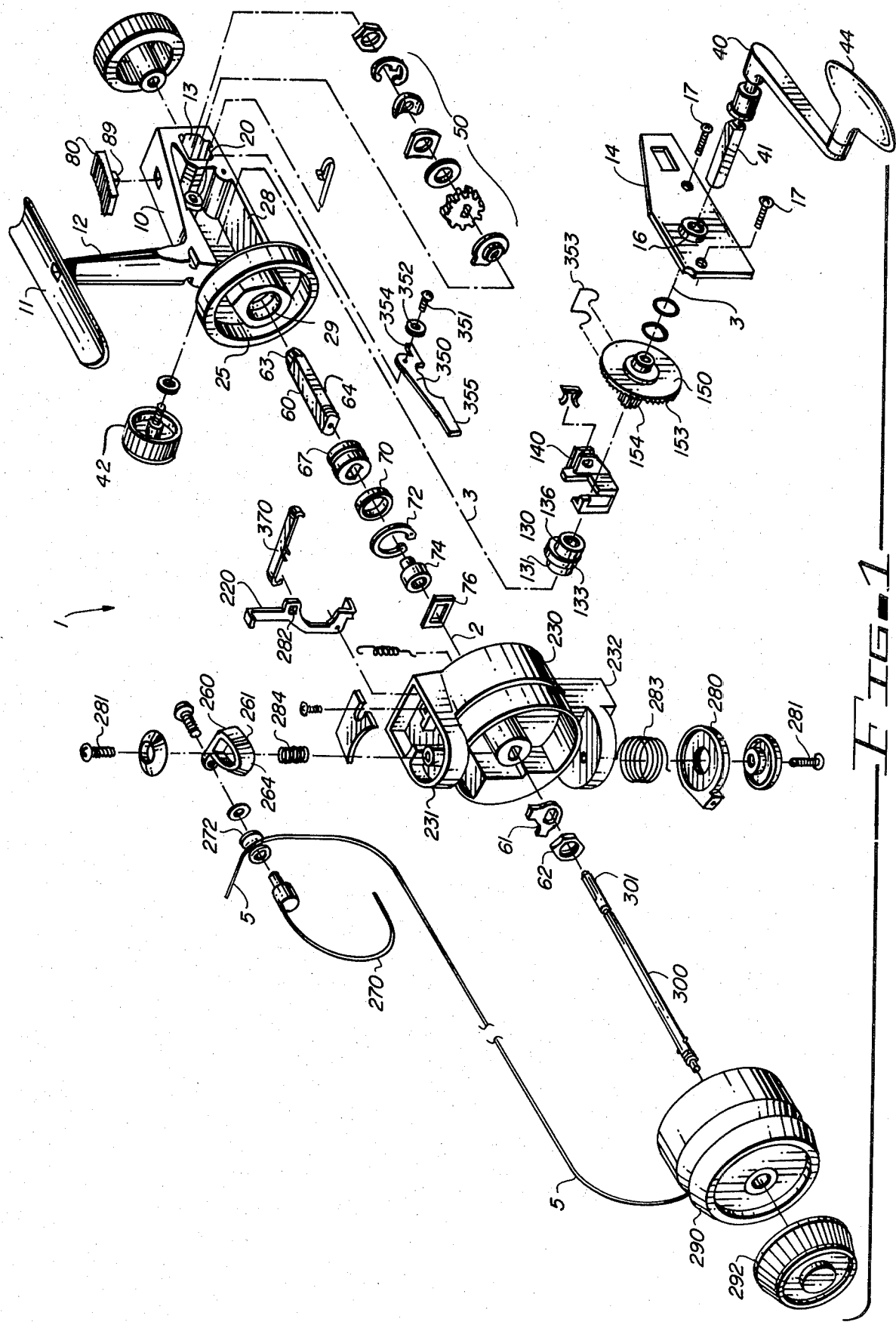
FIG. 1 is an exploded perspective view of a spinning style fishing reel containing the invention described herein.
Figure 2:
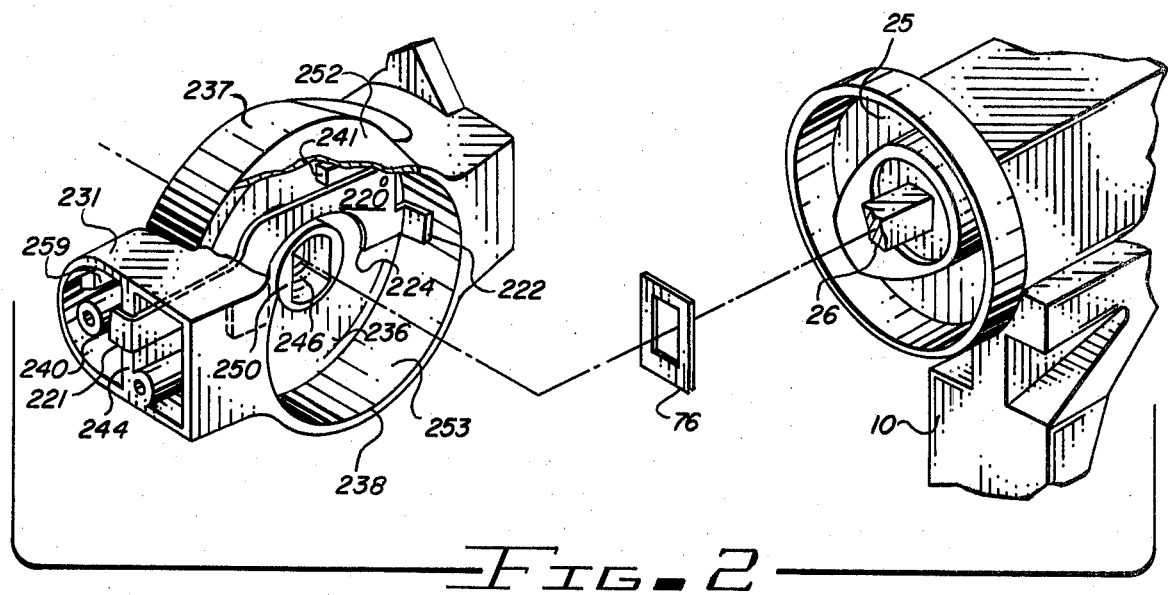
FIG. 2 is a partial exploded perspective view of a portion of the fishing reel containing the invention described herein.

In FIG. 1 an open face style fishing reel 1 is shown in an exploded perspective view. The reel 1 having a housing 10 which includes an integral gear case 28, a stem 22 which connects the housing 10 to a mounting foot 11 which is used to attach the reel to a spinning style fishing rod. The reel includes a crank assembly 40 rotatable about a crank handle shaft 41 with a rotatable winding handle 44 for use by a fisherman with his left hand for line retrieval while the rod (not shown) is being held by his right hand. The handle 44 may be disposed on the other side of the gear case 28 to accommodate the personal desires of the user.

An axially mounted rotor housing 230 is provided and adapted to rotate about the axis of the central spool shaft 300 as the crank 40 is turned for line retrieval with the line 5 being captured by the bail 270 passing over the line roller 272. The bail 270 and the line roller 272 rotate with rotor 230 and the fishing line 5 is thereby wound on the spool 290. The screws 281 function as pivot points and are accordingly the centers of rotation of the bail 270 via the bail arms 260 and 280.

An oscillator mechanism 30 causes the spool 290 to reciprocate axially back and forth as the rotor 230 winds a line 5 about the spool 290; but as in spinning reels generally, the spool 290 does not rotate about the axis of the central shaft 300 except as controllably permitted by the adjustable drag mechanism 50. Such limited rotation of the spool may occur during line retrieval when a fish is on the other end of the line 5 fighting for its life while still in the water; and, thus the force of the drag friction is overcome by tension in the line. This is a feature that prevents the internal mechanism from being destroyed when a large fish in on the end of the line 5. When the bail 270 is swung to an open position for casting, the line 5 may freely payout from the spool 290.

In the overall arrangement of the reel, a side cover plate 14 is secured to the housing 10 to cover the gear housing 28 which includes a drag pocket 13 and is accomplished by means of screws 17. The drive gear assembly 150 includes a drive gear 153 that is mounted on the drive gear shaft 154 and is received at one end in the side lip 136 of cam 130. Bearing collar 131 is coaxial with the lip 136 and mounted on the opposite side of the cam surface 133.

The gear assembly 150 and the oscillator cam 130 each have an internal hole and are coaxially mounted on the crank handle 41 with the drive shaft 154 externally mounted in the side plate bearing 15 and the bearing collar 131 mounted in bearing 16 that is part of the side of the housing 10 and coaxial with bearing 15 (but not shown in FIG. 1). Oscillator slide yoke 140 surrounds cam surface 133 of the cam assembly 130 and is slidably mounted near the bearing 16 in the gear case 28. Retainer screw 42 secures the crank handle shaft 41 to the reel 1. As can be readily appreciated, the crank assembly 40 can be removed from the reel 1 and reversed so that the reel 1 can be held by a fisherman in his left hand and cranked by his right hand.

Pinion assembly 60 is mounted in the front hole 29 of the front face 25 and surrounded by bearing 70 which is kept in place by retainer 72. Mounted inside the gear case 28 on the pinion assembly 60 is the self-centering ratchet 67. In front of retainer 72, a spacer ring 74 and a trip lever 76 are mounted on the pinion 60. The rotor 230 is mounted on the pinion assembly 60 in front of retainer 76 and is secured thereto by means of washer 61 and nut 62. Center spool shaft 300 is rotatably mounted in and supported by the pinion assembly hole 64 with the back end 301 thereof extending past the partition 20 into the drag assembly 50. The spool 290 is mounted on the shaft 300 and secured thereto by means of spool cap 292. The shaft 300 is secured to the oscillator yoke slide 140 and reciprocates back and forth relative to the rotor when the crank handle 41 rotates.

Pinion gear 63 mounted at the back of the pinion assembly 60 mates with the drive gear 153 and is rotatable thereby. The pinion assembly 60 in turn causes the rotor 230 to rotate about the spool 290. Because the oscillator cam assembly 130 and the gear drive assembly 150 are both operated by the crank assembly 40 at the same time, the spool 290 reciprocates back and forth relative to the rotational motion of the line roller 272 about the spool and by this cooperative movement the line 5 is wound around the spool 290.

The axis 2 of the rotor 230, shaft 300, pinion assembly 60, and drag assembly 50 is approximately perpendicular to the axis 3 of the crank handle assembly 40, oscillator mechanism 130 and the drive gear assembly 150. The axis 2 is located above the axis 3 being nearer to the foot 11. The bail 270 is normally stored in the "closed" or "retrieve" position whereby the line roller 272 functions to wind the line 5 about the spool 290 by turning the handle 44 relative to the reel 1. When the bail 270 is to be open or placed in the "casting" or "open" position, the bail 270 is pivoted about the L-shaped bail ears 231 and 232 and locked in place by the trip lever 220 that is received by the cam 261 and trip ramp 264 surfaces located on the underside of the bail arm 260 (not shown in FIG. 1); the underside of bail arm 260 faces into the cavity of the ear 231.

In the casting position, the line 5 is free to payout from the spool 290. During casting, this payout of the line is quite rapid, thus, the fisherman using this open faced style fishing reel is obligated to use his finger to snub the line to arrest the payout since neither the rewind or line retrieval mode (the winding of the line about the spool 290 by the line roller 272) or the drag mechanism 50 is operational. In order to change the bail from the "open" casting position to the "closed" rewind or retrieve position, the rotor 230 is rotated causing the trip lever 220 to disengage from the trip ramp 264 permitting the bail return springs 283 and 284 to pivot the bail 270 back to the retrieve position.

A feature of this fishing reel is a self-centering bail mechanism that permits the rotation of the rotor 230 to the same position for opening the bail 270 at the optimum casting position. A self-centering lever arm 350 is mounted within the gear case by means of screw 351 and washer 352 with the back end 354 of the arm 350 in operable engagement with the self-centering button 80. The lever arm spring 353 mounted on the drive gear shaft 154 urges the pawl end 355 toward the ratchet 67. But, with the button 80 in the back position, the pawl 355 is pivoted out of engagement with the ratchet 67. When the button 80 is in the forward position closer to the stem 12 and farther from the drag assembly 50, then the bottom of the button 80 permits the pawl end 355 of the arm 350 to come into contact with the ratchet 67 so that the rotor 230 can be rotated "backwards" (counter to thee direction of rotation for winding the line around the spool) to a pre-selected position for opening the bail at the casting position. The same mechanism acts as an anti-reverse device for the reel so that the rotor can only be rotated "backward" less than one revolution.

DESCRIPTION OF THE PREFERRED EMBODIMENTS

In all well-made spinning type fishing reels, the rotors are well balanced and revolve freely about the central shaft when rotated by the crank-gear assembly. Normally, the better the spinning sytle fishing reel, the smoother the rotational action of the crank in conjunction with the rotor as it winds line about the spool. These better reels are touted for their very low internal gear and winding friction. Although a pleasure to use, such fishing reels with very smooth and low frictional revolving rotors have also proven to be very annoying to fishermen. When the bail is placed in the open casting position, the rotor can freely rotate, and, as quite frequently happens, causes the bail trip mechanism to permit the bail to snap to the retrieve position before or during casting.

This undesirable characteristic of fine fishing reels has been eliminated by the invention comprehended herein. In a preferred embodiment of the invention, the front face 25 of the reel housing 10 includes a circular brake drum 27 having an inner surface 31 and an exterior surface 32. A face cam 26 on the face 25 is coaxial with the drum 27. The rotor 230 is coaxially mounted in the front of the housing 10 on pinion assembly 60 with the rotor 230 surrounding the external surface 32 of the stationary brake drum 27. Mounted on the central deck 236 of the rotor 230 is the trip lever 220 with cam follower 222. Positioned on the trip lever 220 in a hole (hidden from view) is a rotor brake 370 with an elongated bar 379 and a central gripping area 375. The bar 379 is divided into first and second resilient cantilevered spring arms 371 and 372. Brake shoes 373 and 374 are located at the distal ends of the arms 371 and 372. In the embodiment shown in FIG. 3, the gripping means 375 comprises a pair of prongs 376 each with resilient locking darts 377. The darts 377 are pushed into a hole 282 in the lever 220 with brake 370 being locked therein. The relative position of the brake 370 and the lever 220 is shown in FIGS. 4, 5 and 6. An elongated slot 360 in deck 236 provides clearance for prongs 376 and darts 377 as a trip lever 220 slides back and forth.

When the bail 270 is in the retrieving position, as shown in FIG. 5, it is very desirable that the rotor 230 rotate freely and easily about the axis 2. As little internal friction as possible should exist between the crank 40 and the line roller 272. The cam follower 222 of the trip lever 220 is radially outwardly projected from the axis 2 and does not contact the cam 26. The rotating brake 370 is secured to the lever 220 and withdrawn from any contact with the stationary drum 27 permitting unhampered rotation of the rotor 230.

Cocking the bail 270 to the casting position causes the cam follower 222 of lever 220 to shift closer to axis 2, as shown in FIG. 6. With the bail 270 in the casting position, the brake shoes 373 and 374 come into contact with and bear against the inner surface or wall 31 of the brake drum 27. The flexible cantilever spring arms 371 and 372 force the brake shoes 373 and 374 firmly against the drum 27. The pressure of the shoes 373 and 374 rubbing on the drum 27 essentially eliminate any relative movement between the rotor 230 and the housing 10 when the bail is in the casting position. Therefore, the fisherman is free of the annoying problem of the inadvertent bail trip caused by the free rotation of the rotor.

In the embodiment of the invention shown in FIG. 3, the brake 370 is a molded plastic part made from any suitable resilient plastic material. The stationary brake drum is depicted as being formed as an integral part of the housing 10; however, it is fully contemplated that a separate brake drum could be secured to the reel face by a number of different means in order to simplify die casting of the reel housing and to reduce the cost of manufacturing.

Figure 7:
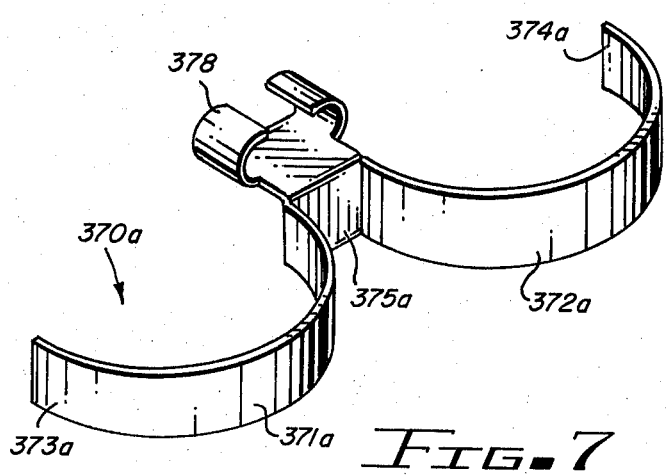
FIG. 7 is a perspective view of another embodiment of the invention described herein.
Figure 10:
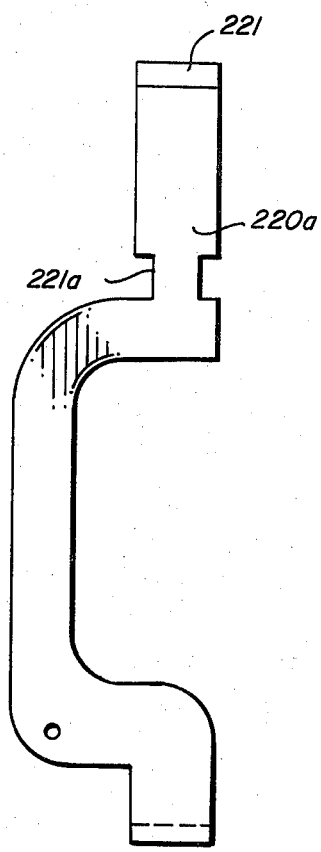
FIG. 10 is a side elevation view of the trip lever modified to accept the embodiment of the invention as shown in FIG. 7.
Figure 8:
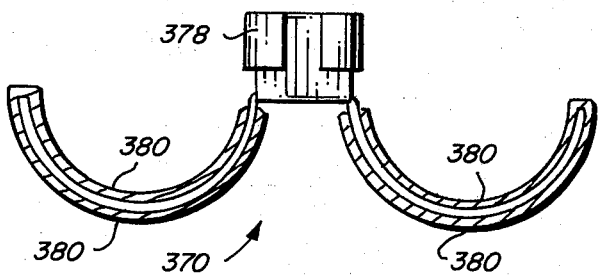
FIG. 8 is a top elevation view of one embodiment of the invention described herein.
Figure 9:
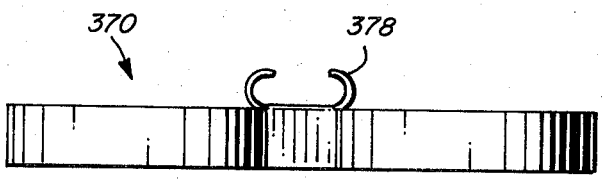
FIG. 9 is a front elevation view of the embodiment of the invention shown in FIG. 7.

In an alternative embodiment of the invention shown in FIG. 7-9, a thin piece of flat metal spring stock is fashioned with two cantilever resilient spring arms 371a and 372a and brake shoes 373a and 374a at the distal ends thereof. A pair of gripping jaws 378 are bent such that they can fit onto undercut slots 221a of the modified trip lever 220a, shown in FIG. 10. It has been found advantageous to coat the brake shoes 373a and 374a with a poor sliding material. This has been accomplished by dip coating a plastic material or placing a heat shrinkable plastic tubing 380 on the brake shoes 373a and 374a as shown in FIG. 8.

Contrary to most brake shoe-brake drum arrangements, the brake drum 27 is stationary and the shoes 373 and 374 rotate. The degree of braking power or effectiveness is a combination of (1) the resiliency of the material used, (2) the size of the shoes and the cantilever arms, (3) the material used to make the drums and shoes and the coefficient of friction therebetween, and (4) the force exerted by the drum on the shoes.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

What is claimed is:

1. In an open face spinning reel used for casting a bait attached to a fishing line and for retrieving the bait and fishing line after casting, the reel having a housing with a front forward spool end face, a back end and a central passageway extending from the face to the back end defining a central axis, a pinion assembly mounted in the housing, a central shaft rotatably mounted in the housing and coaxial with the central axis, a spool mounted on the shaft for holding the fishing line, a handle and gear train assembly mounted in the housing, a rotor having a bail for winding the fishing line about the spool in the retrieving position coaxial with the central axis and mounted adjacent the face and rotatable by cooperative movement of the gear train and pinion assemblies, a movable bail mounted on the rotor having an open casting position and a closed retrieving position, improvement being an internally mounted mechanism for preventing inadvertent or undesirable rotation of the rotor when the bail is in a casting position comprising:
   (a) a brake drum mounted on the forward face of the housing coaxial with the central axis;
   (b) the rotor comprising:
      (1) a central desk having a front opening cylinder extending toward the front end of the reel and a back opening cylinder extending toward the back of the reel having an internal bowl, the front and back cylinders having an external surface,
      (2) pivot means secured to the external surface of the cylinders,
      (3) the rotor mounted such that the bowl surrounds the brake drum;
   (c) a U-shaped bail with two ends;
   (d) first and second bail arms, each of the bail ends mounted in a bail arm, the bail arms mounted to the pivot means;
   (e) elongated trip lever means slidably mounted on the deck having a cam follower and a trip end, the lever means being substantially perpendicular to the central axis;
   (f) means for biasably urging the cam follower toward the central axis; and,
   (g) brake means mounted in the trip lever means and pressing against the brake drum for limiting the free rotation of the rotor when the bail is in the casting position.

2. In a spinning type fishing reel having a housing with a front spool end, a shaft mounted in the housing and defining a central axis, a spool mounted on the shaft at the spool end, a rotor mounted on the reel coaxial with the spool and having a central deck substantially perpendicular to the central axis, a bail mounted on the rotor and having a casting and a retrieving position, lever means associated with the rotor for holding the bail in the casting position, the improvement being an internal mechanism preventing undesirable rotation of the rotor when the bail is in the casting position comprising:
   (a) a brake drum mounted on the front spool end of the housing; and,
   (b) brake means associated with the lever means and mounted thereon within the rotor for pressing against the brake drum when the bail is in the casting position.

3. In a spinning style fishing reel having a housing with a front spool face, a rotor mounted on the housing having a bail that has an open casting position and a closed retrieving position, an improved means for preventing the undesirable rotation of the rotor when the bail is in the casting position comprising:
 (a) brake drum means mounted on the front spool face;
 (b) lever means for holding the bail in the open casting position mounted on the rotor; and,
 (c) brake means mounted on the lever means for pressing against the brake drum when the bail is in the casting position.

4. The reel of claim 1, 2 or 3 wherein the brake drum is stationary.

5. The reel of claim 4 wherein the brake means is rotatable.

6. The reel of claim 5 wherein the brake drum is a ring.

7. The brake drum of claim 6 wherein the ring is cylindrical.

8. The reel of claim 1, 2 or 3 wherein the brake drum has external and internal surfaces.

9. The reel of claims 1, 2 or 3 wherein the lever means has a mounting slot.

10. The reel of claims 1, 2 or 3 wherein the brake means comprises a spring.

11. The reel of claim 10 wherein the spring has a central section and two cantilever arms extending therefrom.

12. The reel of claim 11 wherein each of the cantilever arms has a free end.

13. The reel of claim 11 wherein each of the cantilever arms has a brake shoe at the free end.

14. The reel of claim 13 wherein the brake shoes rub against the brake drum.

15. The reel of claim 11 wherein the central section has a prong that fits into the mounting slot securing the spring to the lever means.

16. The reel of claim 14 wherein the spring is made from spring-tempered metal.

17. The reel of claim 16 wherein the brake shoes are coated with a plastic material to reduce any noise created by the rubbing action of the brake shoes against the brake drum.

18. The reel of claim 15 wherein the spring is made from resilient plastic.

19. The reel of claim 18 wherein the prong has a pair of holding parts.

20. The reel of claim 16 wherein the prong has a pair of gripping jaws.

21. The reel of claim 13 wherein the cantilever arms are resilient leaf springs.

* * * * *